Feb. 7, 1928. 1,658,356
E. SCHAAFF
METHOD OF PRODUCING CHARTS FOR TESTING COLOR VISION
Filed April 20, 1926
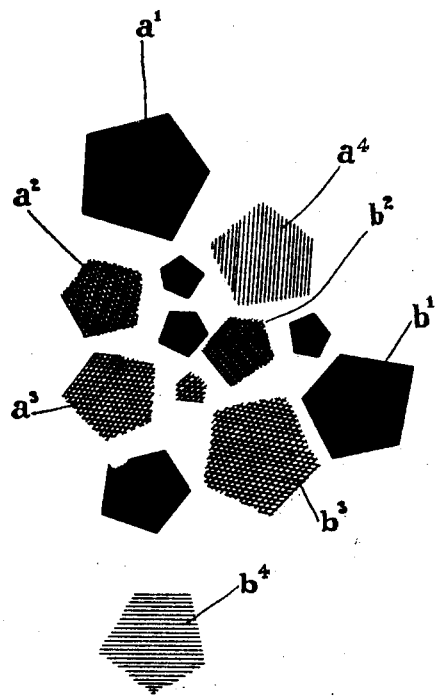
INVENTOR.
Ernest Schaaff
BY
ATTORNEY.

Patented Feb. 7, 1928.

1,658,356

UNITED STATES PATENT OFFICE.

ERNEST SCHAAFF, OF STRASBOURG, FRANCE.

METHOD OF PRODUCING CHARTS FOR TESTING COLOR VISION.

Application filed April 20, 1926, Serial No. 103,372, and in France May 28, 1925.

For testing color vision printed charts are usually employed each of which comprises two or more confusing colors. It is well known that in order to produce the desired effect such colors must have equal intensities, which in practice if not impossible, is at least very difficult to obtain by means of the usual lithographic methods. In order to remedy this defect it has been proposed to employ charts comprising confusing colors of different shades.

By the present invention, I propose to simplify the manufacture of such charts and to render them more practical and more economical, and this I accomplish by grouping on a single chart a plurality of preferably polygonal surfaces of two different colors of various shades or intensities. Thus, by using a cross-hatching consisting of fine lines of the particular color and intersecting one or more times, or by employing dots, or any other method of graphic representation, I can produce a surface having a very clear or light tone, whilst by thicker and more closely arranged lines or dots, the impression of a darker or more saturated shade is imparted to the observer.

By a judicious choice of lines full dotted, mixed, etc., and their disposition, thickness and direction, an entire gamut of sensations of shades can be obtained with a single base color, and the multiple color impression is transformed in this manner as regards each color into an impression of a single color of different values giving the sensation of several shades and masking in consequence the lithographic defects, unsuitable for juxtaposing two confusing colors which, in order to be able to be confounded by the color blind must be of precisely equal values.

By proceeding in the above manner, with a single base color, one can obtain color patches varying between a scarcely perceptible pale tone obtained by very fine lines, which may be replaced by dots, and a deep or saturated tone constituted by an uninterrupted patch, and passing through an almost unlimited gamut of intermediate tones obtained by the crossing or superposition of different figures, or by the use of lines progressively thicker and disposed more closely together, if desired in chequers of various conformations.

It is obvious that the carrying out of the above described process must be adapted to the nature of the charts to be produced, and the surfaces of colors are subject to the most diverse variations in shape, size and distribution. Thus they may be presented in the shape of squares, or any other geometrical or fancy figures so as to form the most varied designs.

Specimens have been filed to illustrate this description.

The single figure of the accompanying drawing shows, by way of example, a portion of a chart produced in accordance with applicant's invention. This portion contains polygonal figures $a$, $a^1$, $a^2$, $a^3$, $a^4$, tinted, for instance, red, and polygonal figures $b$, $b^1$, $b^2$, $b^3$, $b^4$ tinted, for instance, green. These polygonal figures are obtained by more or less close cross-hatching in such a way that various shades of red, e. g. four, and various shades of green, e. g. four, result, varying from deep red or deep green to very light red and very light green respectively.

I claim:

A chart for testing the color sense of the human eye comprising a single surface, such as a sheet of paper, provided with a plurality of isolated patches in two colors of varying shades produced by lines or dots arranged more or less closely together.

In testimony whereof I affix my signature.

ERNEST SCHAAFF.